United States Patent [19]

Sharangpani et al.

[11] 4,426,291

[45] Jan. 17, 1984

[54] SOLVENT EXTRACTION OF NITRATED ORGANIC COMPOUNDS FROM AQUEOUS SOLUTIONS

[75] Inventors: Shrikishna G. Sharangpani; Floyd G. Spence, both of Holland, Mich.

[73] Assignee: BASF Wyandotte Corporation, Wyandotte, Mich.

[21] Appl. No.: 323,740

[22] Filed: Nov. 23, 1981

[51] Int. Cl.$^3$ .............................................. B01D 11/04
[52] U.S. Cl. .................................................... 210/634
[58] Field of Search ................... 8/589, 676; 210/634; 423/413

[56] References Cited

U.S. PATENT DOCUMENTS 2,955,903  10/1960  Gaetani ................................... 8/589

OTHER PUBLICATIONS

Handbook of Chemistry and Physics, 1949, pp. 688, 689, 988, 989, 728 and 729. No.-634.

*Primary Examiner*—Frank A. Spear, Jr.
*Attorney, Agent, or Firm*—Bernhard R. Swick

[57] ABSTRACT

This invention relates to a process for the separation of a nitrated substance from a spent nitrating acid wherein said nitrated substance contains polar groups selected from the group consisting of —SO$_3$H, —OH, —SH —CO$_2$H, —OSO$_3$H, and —OP(OH)$_2$ and their salts. This is achieved by:

(1) diluting the nitrated substance-spent acid solution with water, (2) adding a monohydric alcohol or ketone extraction agent which is immiscible with the spent acid, (3) permitting the mixture to separate into layers of different densities one of said layers comprising said nitrated substance dissolved in said extracting agent, (4) removing said nitrated substance-extracting agent layer, (5) separating the nitrated substance from the extracting agent layer, and (6) reducing the nitrated substance to an amine.

14 Claims, No Drawings

SOLVENT EXTRACTION OF NITRATED ORGANIC COMPOUNDS FROM AQUEOUS SOLUTIONS

BACKGROUND OF THE INVENTION

1. Field of the Invention

This invention relates to separation of a nitrated substance from a spent nitrating acid in which the nitrated substance is soluble. More particularly, this invention relates to such separation wherein the nitrated substance contains strongly polar substituents which would be expected to cause the nitrated substance to remain in the spent acid when attempts are made to extract it with a solvent.

2. Discussion of the Prior Art

In the preparation of amines, particularly amine dyes and pigments, it is known in the prior art nitrate a desired substance with nitric acid. Since water is formed during nitration and also retards reaction, it is desirable to tie this water up during nitration. Accordingly, the nitration is generally carried out in the presence of an additional strong acid such as sulfuric acid or phosphoric acid. After nitration the nitric acid is, in general, depleted and the remaining acid which is primarily additional strong acid is referred to as spent nitrating acid. The nitrated substance is then separated from the spent acid, followed by reduction to the amine. One conventional reduction method is iron-acid reduction and another is by catalytic hydrogenation.

In accordance with prior art practice after nitration the reaction mixture generally contains by weight about 5 to 80 percent nitrated substance, about 10 to 70 percent spent nitrating acid and about 5 to 15 percent water. This mixture is diluted with about 3 times its weight of additional water and neutralized with limestone and soda ash. The resulting precipitate is removed by filtration and the filtrate is further processed generally by the iron-acid reduction process to produce amines from the nitrated substance. This process has the disadvantages that:

(a) substantial loss of product occurs due to retention of nitrated substance in the gypsum cake;
(b) the gypsum disposal presents environmental problems and
(c) the strong acid and limestone are irreversibly consumed.

Accordingly it would appear that extraction with a solvent would be an alternative which would avoid these disadvantages. However, some of the nitrated substances of greatest interest contain polar substituents such as the sulfonic acid group, as in 2-chloro-5-nitrotoluene-4-sulfonic acid, —OH, —SH, —CO$_2$H, —OSO$_3$H, and —OP(OH)$_2$ which render the nitrated compound very soluble in aqueous systems and relatively insoluble in most of the solvents which are immiscible with water.

Accordingly, it is the purpose of the instant invention to provide a process for removing a nitrated substance from a solution of a strong acid in which it is soluble when said nitrated substance contains polar substituent groups which would normally be expected to cause the nitrated substance to remain in the acid layer.

SUMMARY OF THE INVENTION

This invention relates to a process for the separation of a nitrated substance from a spent nitrating acid wherein said nitrated substance contains polar groups selected from the group consisting of —SO$_3$H, —OH, —SH —CO$_2$H, —OSO$_3$H, and —OP(OH)$_2$ and their salts. This is achieved by:

(1) diluting the nitrated substance-spent acid solution with water,
(2) adding a monohydric alcohol or ketone extraction agent which is immiscible with the spent acid,
(3) permitting the mixture to separate into layers of different densities one of said layers comprising said nitrated substance dissolved in said extracting agent,
(4) removing said nitrated substance-extracting agent layer,
(5) separating the nitrated substance from the extracting agent layer, and
(6) reducing the nitrated substance to an amine.

DETAILED DESCRIPTION OF THE INVENTION

The nitrated substance to which this invention is particularly applicable is 2-chloro-5-nitrotoluene-4-sulfonic acid since this presents a particularly difficult problem in view of the fact that the sulfonic acid group SO$_3$H particularly renders the nitrated substance soluble in the aqueous spent acid whereby the nitrated substance would normally remain in the spent acid layer when treated with conventional solvents. Other nitrated substances are the chloro-nitrobenzene-sulfonic acids, 2-chloro-5-nitroethylbenzene-4-sulfonic acid, 2-chloro-5-nitroisopropylbenzene-4-sulfonic acid, 2-nitrotoluene-4-sulfonic acid, meta-nitrobenzene-sulfonic acid, 2-nitroethylbenzene-4-sulfonic acid, 2-nitro iospropylbenzene-4-sulfonic acid and the nitro napthalene sulfonic acids.

The preferred monohydric alcohol or ketone extracting agents are those containing from 5 to 12 carbon atoms. The most preferred extracting agent is methyl isobutyl carbinol. Other preferred extracting agents include 2-methyl-1-butanol, 3-methyl-2-butanol, 2,4-dimethyl-3-pentanol and 2-ethyl-1-hexanol. The preferred ratio of nitrated substance-acid solution to extracting agent by weight is about 10:1 to 1:10.

Water is added to the nitrated substance-acid solution, preferably before the extracting agent. However, the water may be added after the addition of the extracting agent. In any event, the water concentration is adjusted such that the extracting agent is immiscible with the acid. Such adjustment of the water concentration is the critical point in the invention whereby the nitrating acid concentration is kept as high as possible which produces a salting out effect which forces the nitrated compound into the extracting agent. The optimum ratio of the nitrated substance-acid solution to water is by weight 1:1.

Layer separation is excellent when a ratio of nitrated substance-acid solution to water is greater than 1:1 whereas large quantities of H$_2$SO$_4$ are transferred to the solvent phase when the ratio is less than 1:1. Losses of solvent in aqueous phase are higher the more dilute the nitrated substance-acid solution is. The preferred range of total water in nitrated substance-acid-extracting agent mixture after water addition is about 25 to 85 percent by weight.

In order to recover all of the nitrated substance, multiple counter current extractions may be employed. The solvent can be recovered by re-extraction with either water or dilute caustic solution so that the nitro compounds can be transferred back to the aqueous phase leaving behind pure solvent that can be recovered by layer separation. The aqueous solution can then be reduced to the amine by any prior art process such as the conventional iron-acid reduction. Alternatively, catalytic hydrogenation may be employed as a method of reduction. This may be run directly before separation of the extracting agent from the nitrated substance, that is, without first isolating the nitrated substance. The resulting amine then precipitates and can be separated from the extracting agent by simple filtration. In general, the extraction is carried out at ambient temperature and pressure. The time is generally whatever is required. A good permissible range for temperature could be about 0° C. to 100° C. and more particularly about 20° to 50° C. The pressure may range from about 0.1 to 10 atmospheres absolute. The time is simply that necessary to achieve the desired degree of separation of the upper and lower phases which generally is a matter of about 10 to 15 minutes.

The instant invention is more particularly illustrated by the following examples wherein all parts indicated are by weight and temperatures are in degrees centigrade unless otherwise stated.

EXAMPLE 1

To 100 grams of water was added 100 grams of a liquor composed of 56 grams of 2-chloro-5-nitrotoluene-4-sulfonic acid, 36 grams of (concentrated, i.e., 100 percent) sulfuric acid and 8 grams of water. The resulting diluted liquor was then extracted with 100 grams of methyl-isobutylcarbinol by vigorous mixing of the liquor and alcohol followed by separation of the two phases. The alcoholic layer was then adjusted to neutral pH by adding sodium carbonate until no more $CO_2$ was evolved. A palladium catalyst (1 gram of 5 percent palladium on carbon) was added and the mixture subjected to a pressure of 500 psig of hydrogen at a temperature of 130° C. until no more hydrogen was consumed. The mixture was filtered to recover the methyl-isobutylcarbinol (filtrate) and the solid was digested with 500 ml of water at a pH of 8 and 65° C. This was then refiltered to recover the palladium catalyst and the filtrate was acidified with concentrated HCl to a pH of 1.0 to reprecipitate the amino chloro toluene sulfonic acid. The final precipitate contained 25 grams of 5-amino-2-chlorotoluene-4-sulfonic acid plus about 1 gram of other isomers. The filtrate contained about 20 grams of other isomers, as determined by nitrite titration; thus, the reduction yielding about 93 percent. The first filtration gave 63 grams of recovered methyl-isobutylcarbinol with the balance (approximately 31 grams) being in the final filtrate.

EXAMPLE 2

The process of Example 1 is performed with the exception that after the extraction with the methyl-isobutylcarbinol by mixing of the liquor and alcohol and separation thereof into two phases the solvent is recovered by re-extraction with water whereby the 2-chloro-5-nitrotoluene-4-sulfonic acid is transferred back to an aqueous phase leaving behind pure solvent which is then separated by layer separation. The aqueous solution of the 2-chloro-5-nitrotolulene-4-sulfonic acid is then reduced to the amine by conventional iron-acid reduction.

We claim:

1. In a process for the preparation of amine dyes and pigments the improvement for the separation of a nitrated substance from a spent nitrating acid wherein said nitrated substance contains polar groups selected from the group consisting of $-SO_3H$, $-OH$, $-SH$, $-CO_2H$, $-OSO_3H$, and $-OP(OH)_2$ and their salts comprising
   (1) adding an extracting agent selected from the group consisting of monohydric alcohols and ketones containing about 5 to 12 carbon atoms to said nitrating substance-spent acid solution,
   (2) diluting the nitrated substance-spent acid solution with water, prior or subsequent to said addition of said extracting agent
      (a) the concentration of water in said solution being such that said extracting agent is immiscible with said acid
   (3) permitting the mixture to separate into layers of different densities with
      (a) one of said layers comprising said nitrated substance dissolved in said extracting agent
   (4) removing said nitrated substance-extracting agent layer and
   (5) separating the nitrated substance from said extracting agent layer.

2. The process of claim 1 wherein said dilution of said nitrated substance-spent acid solution with water is prior to said addition of said extracting agent.

3. The process of claim 1 wherein said dilution of said nitrated substance-spent acid solution with water is subsequent to said addition of said extracting agent.

4. The process of claim 2 wherein said nitrated substance is subsequently reduced to an amine by the iron-acid reduction process.

5. The process of claim 2 wherein the nitrated substance is reduced to the amine by catalytic hydrogenation prior to separation from said extracting agent, followed by separation of the amine.

6. The process of claim 2 wherein said spent acid is primarily an acid selected from the group consisting of sulfuric acid and phosphoric acid, said nitrated substance is selected from the group consisting of 2-chloro-5-nitrotoluene-4-sulfonic acid; the chloro-nitrobenzene-sulfonic acids, 2-chloro-5-nitroethylbenzene-4-sulfonic acid, 2-chloro-5-nitroisopropylbenzene-4-sulfonic acid, 2-nitrotoluene-4-sulfonic acid, meta-nitrobenzene-sulfonic acid, 2-nitroethylbenzene-4-sulfonic acid, 2-nitro isopropylbenzene-4-sulfonic acid and the nitro napthalene sulfonic acids; and said extracting agent is selected from the group consisting of methyl-isobutyl-carbinol; 2-methyl-1-butanol; 3-methyl-2-butanol; 2,4-dimethyl-3-pentanol; and 2-ethyl-1-hexanol.

7. The process of claim 6 wherein said nitrated substance is subsequently reduced to an amine by the iron-acid reduction process.

8. The process of claim 6 wherein the nitrated substance is reduced to the amine by catalytic hydrogenation prior to separation from said extracting agent, followed by separation of the amine.

9. The process of claim 6 wherein said nitrated substance-spent acid composition contains from about 5 to 80 percent by weight of said nitrated substance, about 10 to 70 percent by weight of said acid, about 5 to 15 percent by weight water and wherein the weight ratio of said nitrated substance-spent acid composition to said extracting agent is about 10:1 to 1:10 and water is added to said nitrated substance-acid solution in amount such that the total amount of water in the nitrated substance-acid-extracting agent mixture is about 25 to 85 percent.

10. The process of claim 9 wherein said nitrated substance is subsequently reduced to an amine by the iron-acid reduction process.

11. The process of claim 9 wherein the nitrated substance is reduced to the amine by catalytic hydrogenation prior to separation from said extracting agent, followed by separation of the amine.

12. The process of claim 9 wherein said nitrated substance is 2-chloro-5-nitrotoluene-4-sulfonic acid, said spent acid is primarily sulfuric acid and said extracting agent is methylisobutylcarbinol.

13. The process of claim 12 wherein said nitrated substance is subsequently reduced to an amine by the iron-acid reduction process.

14. The process of claim 12 wherein the nitrated substance is reduced to the amine by catalytic hydrogenation prior to separation from said extracting agent, followed by separation of the amine.

* * * * *